UNITED STATES PATENT OFFICE.

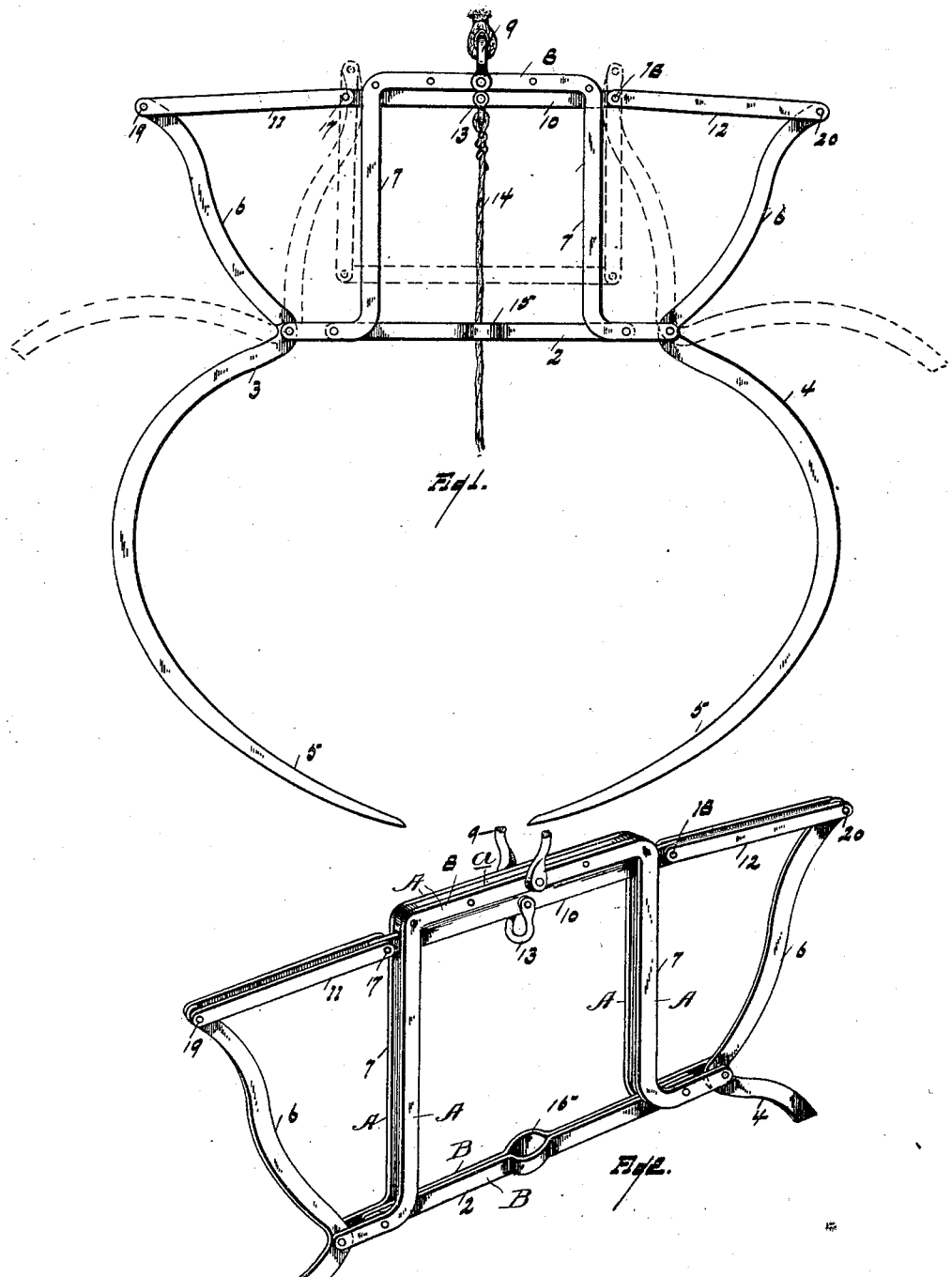

SETH A. NICHOLS, OF FOWLERVILLE, MICHIGAN.

HAY-FORK.

SPECIFICATION forming part of Letters Patent No. 697,742, dated April 15, 1902.

Application filed September 30, 1901. Serial No. 77,040. (No model.)

*To all whom it may concern:*

Be it known that I, SETH A. NICHOLS, a citizen of the United States, residing at Fowlerville, county of Livingston, State of Michigan, have invented a certain new and useful Improvement in Hay-Forks; and I declare the following to be a full, clear, and exact description of the invention, such as will enable others skilled in the art to which it pertains to make and use the same, reference being had to the accompanying drawings, which form a part of this specification.

This invention relates to hay-forks, and has for its object an improvement in that class of hay-forks in which the bundle of hay is grasped and lifted by grapple-tines which remain in close lifting engagement therewith and are held in position by a system of links until the bundle of hay has been lifted and conveyed properly, and then by bending the linkage the grapple-tines are spread and the bundle of hay drops from the tines by its own weight.

In the drawings, Figure 1 shows the fork in elevation. Fig. 2 shows the fork in perspective.

A frame of two uprights 7 7 and a cross-bar 8 are rigidly secured to the main bar 2. At the middle part of the cross-bar 8 is secured the lifting-clevis 9. Said frame is made of strips of iron or "strap-iron." Two strips A A are bent to form three sides of a rectangle, with their ends turned outward, and are secured together with their corresponding parts parallel and held a small distance apart by interposed parts. The main bar 2 is composed of two flat pieces B B, laid side by side, with their ends secured between the ends of the pieces A A. The pieces B B are bent outward at their centers to form the eye 15. A bar of iron *a* of about the thickness of the two pieces B B is placed as a distance-piece between the cross-pieces of the strips A A. The bar *a*, together with the cross-pieces of the strips A A, between which it is secured, constitute the cross-bar 8. The vertical portions of the strips A A, spaced from each other by the bar *a* and main bar 2, constitute the uprights 7 7 of the frame. Grapple-tines 3 and 4, each of which has a curved part 5 below the main bar 2 and a curved and somewhat-diverging part 6 above the main bar 2, are pivotally secured between the ends of the strips A A. The ends 6 of the grapple-tines are joined by three links 10 11 12, and the links 10, 11, and 12 are pivotally secured together and to the ends of the grapple-tines. The link 10 extends between the two strips A A, where they form the uprights 7 7, and the link 11 and 12 are each composed of two strips, with the end of links 10 and the end of the grapple-tines pivoted between them. The links 11 and 12 are pivoted to the link 10 a short distance from the uprights 7 7, and the joints from stops which allow the link 10 to turn somewhat from the horizontal, but prevent it form turning very much. To the middle part of the link 10 is secured an eye 13, to which is knotted the trip-rope 14. This passes down through an eye 15 in the middle of the bar 2. The cross-bar 8 is so located with reference to the main bar 2 and with reference to the ends of the grapple-tines 6 that when the bar 10 is in its most elevated position and is parallel to the cross-bar 8 the pivots 17 and 18 are just above a straight line connecting the pivots 19 and 20 and the linkage has just passed the "center," so that strain on the lower ends of the grapples 5 produced by the weight of the hay tends to throw the pivots 19 and 20 toward the cross-bar 8 and to force the middle link 10 upward and bring it into contact with the bar *a* of the cross-bar 8, holding the parts in stable condition, from which, however, they can be easily forced by a slight pull on the cord 14, which will pull down the bar 10, and this easily pulls down, because the linkage can yield at any one of the pivotal points 19 20 or 17 18 and will yield at one of them, pulling down either 17 or 18 below the horizontal line from 19 to 20, and the weight of the bundle of hay immediately opens the forks and the hay drops.

What I claim is—

1. In a hay-fork, the combination of pivoted grapple-tines provided with projections extending above the pivot, a link pivoted to each of said projections, an intermediate link pivoted between the first-mentioned links, a guide and stop arranged to allow the linkage to pass a straight line uniting the joints of the linkage to the grapple-tines, and means for stopping the linkage immediately above the straight line.

2. In a hay-fork, the combination of pivoted grapple-tines provided with projections extending above the pivot, a link pivoted to each of said projections, an intermediate link pivoted between the first-mentioned links, a guide adapted to constrain the movement of said intermediate link, and to allow it to turn to a small, and prevent it turning to a large extent, and a stop arranged to allow the linkage to pass a straight line uniting the joints of the linkage to the grapple-tines, and means for stopping the linkage immediately above the straight line.

3. In a hay-fork, the combination of two parallel strips shaped in the form of a frame having two uprights and a cross-bar, the two strips being spaced from each other at the top, a bar extending between the ends of said uprights, the ends of said bar being secured between said strips to space them from each other at their ends, tines pivoted to said frame and having extensions, links pivoted to said extensions, connected with each other and guided by a part extending between said strips where they form said uprights.

4. In a hay-fork, the combination of two parallel strips shaped in the form of a frame having two uprights and a cross-bar, the ends of said uprights being bent extend laterally from said uprights, the two strips being spaced from each other at the top, a bar extending between the ends of said uprights, the ends of said bar being secured between said strips to space them from each other at their ends, tines pivoted between the laterally-extending portions of said strips and having extensions, links pivoted to said extensions, connected with each other and guided by a part extending between said strips where they form said uprights.

5. In a hay-fork, the combination of two parallel strips shaped in the form of a frame having two uprights and a cross-bar, the two strips being spaced from each other at the top, a bar consisting of two pieces lying parallel and side by side extending between the ends of said uprights, the ends of said bar being secured between said strips to space them from each other at their ends, the constituent pieces of said bar being bent outward to form an eye, tines pivoted to said frame and having extensions, links pivoted to said extensions, connected together and guided by a part extending between said strip where they form said uprights, and a trip-rope secured to said links and extending through said eye.

6. In a hay-fork, the combination of two parallel strips shaped in the form of a frame having two uprights and a cross-bar, said strips being spaced from each other at the top and bottom, tines pivoted on opposite sides of said frame and having upward extensions, links pivoted to said extensions and a link extending between said strips where they form the uprights and pivoted to the first-mentioned links, the intermediate link being provided with stops adapted to prevent its turning too far from a horizontal position by contacting the frame.

7. In a hay-fork, the combination of two parallel strips shaped in the form of a frame having two uprights and a cross-bar, said strips being spaced from each other, at the top and bottom, tines pivoted on opposite sides of said frame and having upward extensions, parallel bars pivoted upon opposite sides of each of said extensions, and a link extending between said strips where they form the uprights and having its ends pivoted between said parallel bars.

In testimony whereof I sign this specification in the presence of two witnesses.

SETH A. NICHOLS.

Witnesses:
MAY E. KOTT,
C. E. JENNINGS.